US008682169B2

(12) United States Patent
Hardaker et al.

(10) Patent No.: US 8,682,169 B2
(45) Date of Patent: Mar. 25, 2014

(54) APPARATUS, SYSTEMS AND METHODS FOR DETECTING INFRARED SIGNALS AT A MEDIA DEVICE CONFIGURED TO BE POSITIONED IN DIFFERENT ORIENTATIONS

(75) Inventors: Trevor Hardaker, Bradford (GB); Chris Lockwood, Halifax (GB)

(73) Assignee: Eldon Technology Limited, Keighley (GB)

( * ) Notice: Subject to any disclaimer, the term of this patent is extended or adjusted under 35 U.S.C. 154(b) by 372 days.

(21) Appl. No.: 13/036,943

(22) Filed: Feb. 28, 2011

(65) Prior Publication Data

US 2012/0219297 A1 Aug. 30, 2012

(51) Int. Cl.
*H04B 10/00* (2013.01)

(52) U.S. Cl.
USPC ............................ 398/106; 398/107; 398/127

(58) Field of Classification Search
USPC .......................... 398/115, 212, 106–107, 127
See application file for complete search history.

(56) References Cited

U.S. PATENT DOCUMENTS

| | | | |
|---|---|---|---|
| 5,296,739 | A | 3/1994 | Heilbronner et al. |
| 5,911,582 | A | 6/1999 | Redford et al. |
| 5,921,757 | A | 7/1999 | Tsutsui et al. |
| 6,128,194 | A | 10/2000 | Francis |
| 6,201,246 | B1 | 3/2001 | Potekev et al. |
| 6,212,074 | B1 | 4/2001 | Gonsalves et al. |
| 6,219,236 | B1 | 4/2001 | Hirano et al. |
| 6,577,504 | B1 | 6/2003 | Lofland et al. |
| 6,665,187 | B1 | 12/2003 | Alcoe et al. |
| 6,818,276 | B2 | 11/2004 | Bourdelais et al. |
| 6,946,856 | B1 | 9/2005 | Tellkamp |
| 6,982,877 | B2 | 1/2006 | Vinson et al. |
| 7,034,999 | B1 | 4/2006 | Casler |
| 7,236,368 | B2 | 6/2007 | Maxwell et al. |
| 7,310,233 | B2 | 12/2007 | Bell |

(Continued)

FOREIGN PATENT DOCUMENTS

| | | |
|---|---|---|
| JP | 02085837 | 3/1990 |
| WO | WO 03/107427 | 12/2003 |
| WO | WO 2009/058149 | 5/2009 |

OTHER PUBLICATIONS

Stephens et al., Matthew, "Passive, Low-Profile Heat Transferring System," U.S. Appl. No. 13/051,930, filed Mar. 18, 2011.
Burton et al., David Robert, "Media Content Device Chassis with Internal Extension Members," U.S. Appl. No. 13/052,685, filed Mar. 21, 2011.

(Continued)

*Primary Examiner* — Dzung Tran
(74) *Attorney, Agent, or Firm* — Lowe Graham Jones PLLC

(57) ABSTRACT

Systems and methods are operable to detect infrared (IR) signals at a media device. Exemplary embodiments include a media device configured to receive media content; at least one IR detector residing in the media device, and configured to receive a portion of IR signals emitted from a remote control; and a cover lens disposed in a portion of an enclosure of the media device. The cover lens has a first cover lens portion configured to receive the IR signals emitted from the remote control and is configured to transmit a first portion of the received IR signal to the IR detector when the media device is horizontally oriented, and has a second cover lens portion configured to receive the IR signal emitted from the remote control and is configured to transmit a second portion of the received IR signal to the IR detector when the media device is vertically oriented.

20 Claims, 4 Drawing Sheets

(56) References Cited

U.S. PATENT DOCUMENTS

| | | | | |
|---|---|---|---|---|
| 7,312,534 | B2 | 12/2007 | delos Santos et al. | |
| 7,345,885 | B2 | 3/2008 | Boudreaux et al. | |
| 7,550,825 | B2 | 6/2009 | Santos et al. | |
| 7,629,400 | B2 | 12/2009 | Hyman | |
| 7,742,299 | B2 | 6/2010 | Sauciuc et al. | |
| 2001/0028342 | A1 * | 10/2001 | Notagashira | 345/157 |
| 2005/0008832 | A1 | 1/2005 | Santos et al. | |
| 2005/0266295 | A1 | 12/2005 | Takai | |
| 2007/0278683 | A1 | 12/2007 | Santos et al. | |
| 2008/0049110 | A1 * | 2/2008 | Arbouzov | 348/211.99 |
| 2008/0135216 | A1 | 6/2008 | Zhang et al. | |
| 2008/0175603 | A1 * | 7/2008 | Son et al. | 398/212 |
| 2010/0261386 | A1 | 10/2010 | Blum et al. | |
| 2011/0202183 | A1 * | 8/2011 | Hardman | 700/276 |

OTHER PUBLICATIONS

Burton et al., David Robert, "Media Device Having a Piezoelectric Fan," U.S. Appl. No. 13/074,964, filed Mar. 29, 2011.

Burton et al., David Robert, "Media Content Device with Customized Panel," U.S. Appl. No. 13/074,971, filed Mar. 29, 2011.

Burton et al., David Robert, "Apparatus, Systems and Methods for Power Line Carrier Data Communication to DC Powered Electronic Device," U.S. Appl. No. 13/074,736, filed Mar. 29, 2011.

Burton et al., David Robert, "Apparatus, Systems and Methods for Securely Storing Media Content Events on a Flash Memory Device," U.S. Appl. No. 13/053,492, filed Mar. 22, 2011.

Burton et al., David Robert, "Apparatus, Systems and Methods for Control of Inappropriate Media Content Events," U.S. Appl. No. 13/053,487, filed Mar. 22, 2011.

PiezoFans, LLC—Piezo Fans and Piezoelectric Technology, "Advanced Micro-Cooling Systems" Product Description, http://piezofans.com/, download date Mar. 4, 2011, 2 pages.

* cited by examiner

APPARATUS, SYSTEMS AND METHODS FOR DETECTING INFRARED SIGNALS AT A MEDIA DEVICE CONFIGURED TO BE POSITIONED IN DIFFERENT ORIENTATIONS

BACKGROUND

Media presentation devices, such as a television, a monitor, or another display device, may be configured to present visual media content to a user. The media content may be received from a media device. The media presentation device may be configured to be placed on top of a horizontally oriented surface, such as a media stand, cabinet, shelf, or the like. Alternatively, the media presentation device may be configured to mount to a vertically oriented surface, such as a wall or the like. However, the media device is typically configured to rest on a horizontally oriented surface. Accordingly, it may be difficult to locate the media device in proximity to the media presentation device.

The media device may be configured to receive operating instructions from a user via a remote control. The remote control communicates user instructions to the media device using an infrared (IR) signal. An IR signal detector of the media device is configured to receive the IR signals. The IR signal detector may only detect the IR signals from the remote control so long as the remote control is within a line of sight detection range of the IR signal detector. This line of sight detection range generally lies along a horizontal plane extending outward into a space where the user is likely to be sitting while viewing the presented media content Conserving space in a media room may be of interest to the user. For example, if the media presentation device is hung on a wall, it may be desirable to the user to also hang the media device from the same wall, and even behind the media presentation device itself. However, the media device is not configured to be oriented vertically, such as when mounted on the wall behind the media presentation device. If the media device is vertically oriented, the IR detector will not be oriented in a manner so as to receive the IR signals from the remote control. That is, the line of sight detection range of the IR signal detector will not correspond to locations where the user will likely be when viewing the presented media content on their media presentation device.

Accordingly, there is a need in the arts to enable detection of IR signals emitted from a remote control by a media device that is configured to be positioned in a plurality of different orientations.

SUMMARY

Systems and methods of detecting infrared (IR) signals emitted from a remote control are disclosed. An exemplary embodiment comprises a media device configured to receive media content; at least one IR detector residing in the media device, and is configured to receive a portion of IR signals emitted from a remote control; and a cover lens disposed in a portion of an enclosure of the media device. The cover lens has a first cover lens portion configured to receive the IR signals emitted from the remote control and is configured to transmit a first portion of the received IR signal to the IR detector when the media device is horizontally oriented, and has a second cover lens portion configured to receive the IR signal emitted from the remote control and is configured to transmit a second portion of the received IR signal to the IR detector when the media device is vertically oriented.

BRIEF DESCRIPTION OF THE DRAWINGS

Preferred and alternative embodiments are described in detail below with reference to the following drawings.

DETAILED DESCRIPTION

Figure 1:
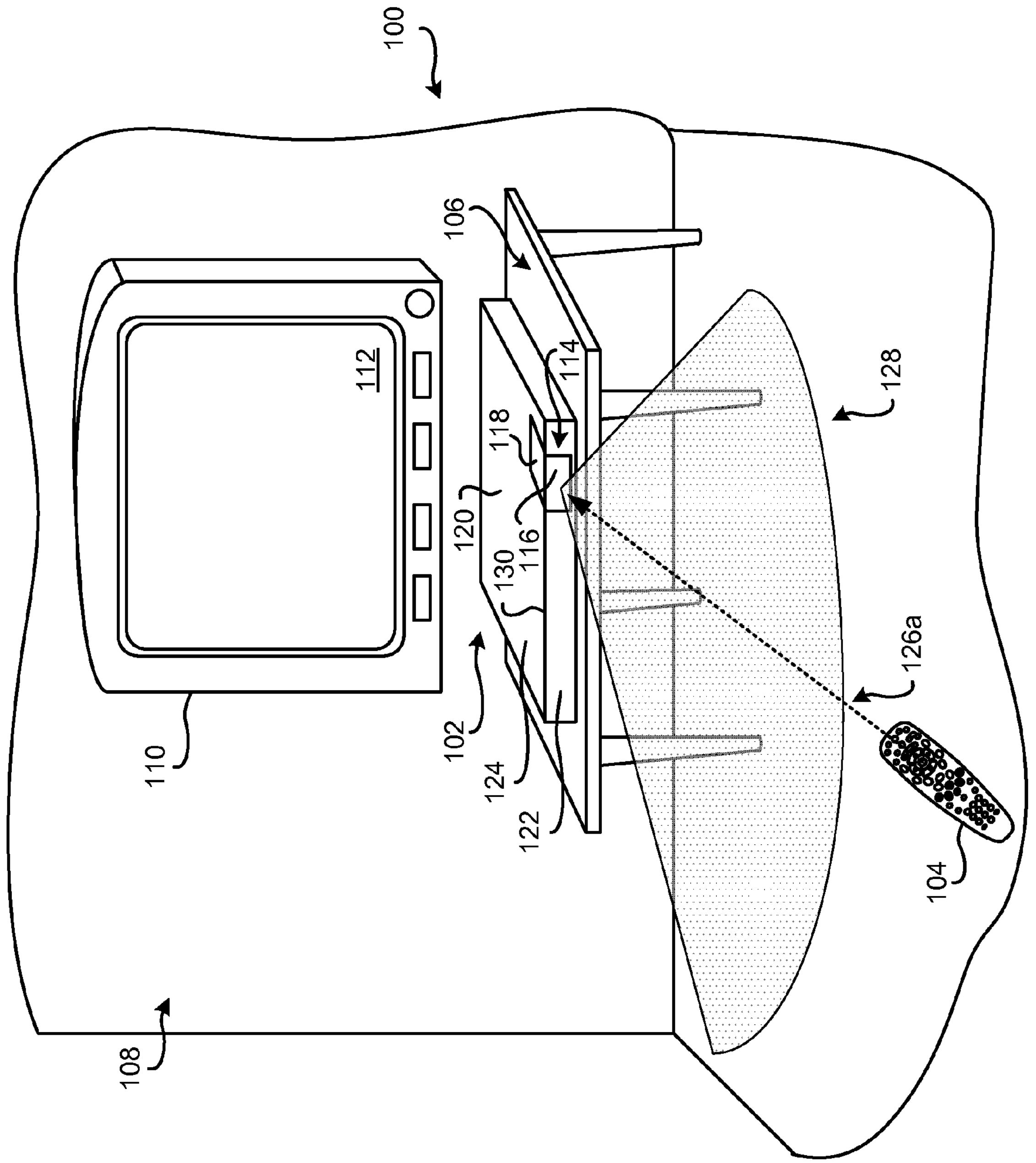
FIGS. 1 and 2 are perspective views illustrating an embodiment of an infrared (IR) detector system implemented in a media device.
Figure 2:
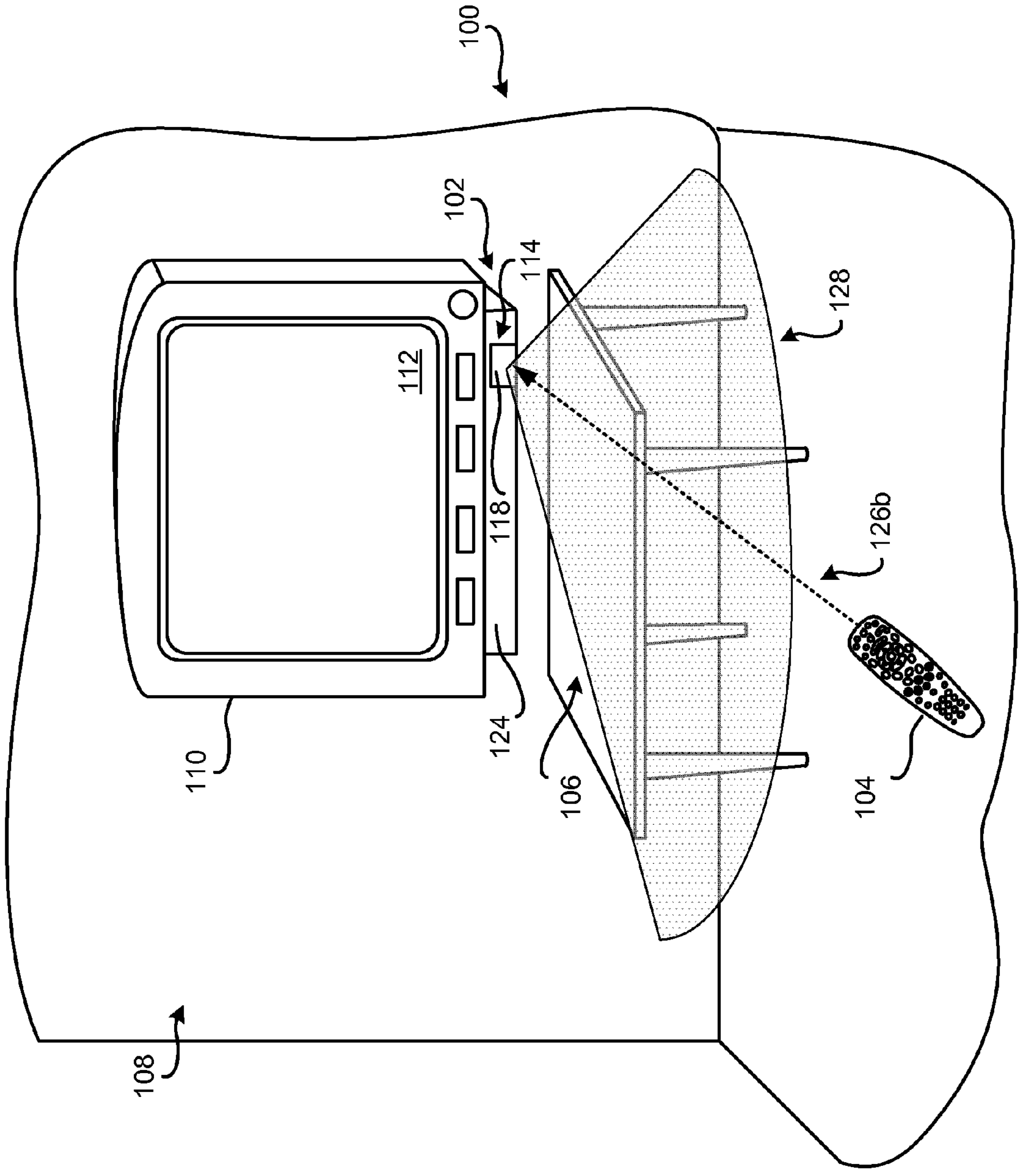

FIGS. 1 and 2 are perspective views illustrating an embodiment of an infrared (IR) detector system 100 implemented in a media device 102, such as, but not limited to, a set top box (STB). The exemplary media device 102 is configured to receive IR communications from a remote control 104 when the media device is horizontally oriented or vertically oriented. Embodiments of the IR detector system 100 may be implemented in other media devices, such as, but not limited to, a stereo, a surround-sound receiver, a radio, a digital video disc (DVD) player, a digital video recorder (DVR), a game playing device, or a personal computer (PC).

In FIG. 1, the exemplary embodiment of media device 102 is located on a horizontally oriented surface 106, such as a table, a media stand, a cabinet, a shelf, or the like. In FIG. 2, the same exemplary embodiment of the media device 102 is located on a vertically oriented surface 108, such as a wall or the like.

In FIGS. 1 and 2, a visual media presentation device 110 (shown generically as a television, or TV) is mounted on the vertically oriented surface 108. However, the visual media presentation device 110 may be mounted on another vertically oriented surface, may be placed onto a horizontal surface so as to rest in a vertically oriented position, or may be placed on or mounted to any other suitable surface or structure. The visual media presentation device 110 includes a display 112 upon which the visual portion of media content is presented.

The IR detector system 100 comprises an exemplary two-way cover lens 114 embodiment that is configured to pass incident IR light to a suitable IR detector (not shown). The exemplary two-way cover lens 114 comprises a first cover lens portion 116 and a second cover lens portion 118 disposed on or in an enclosure 120 of the media device 102. The first cover lens portion 116 is generally parallel to and flush with a first surface 122 of the enclosure 120 of the media device 102. The second cover lens portion 118 is generally parallel to and flush with a second surface 124 of the enclosure 120 the media device 102. Accordingly, the first cover lens portion 116 and the second cover lens portion 118 are generally oriented perpendicular to each other.

As illustrated in FIGS. 1 and 2, the remote control 104 is configured to transmit an IR signal 126*a*/126*b* that is receivable by the media device 102. The remote control 104 is generally located somewhere along a line of sight detection range that generally corresponds to a horizontal plane 128 which extends outward into a space where the user is likely to be located while viewing the presented media content on the display 112 of the visual media presentation device 110.

As illustrated in FIG. 1, when the exemplary embodiment of media device 102 is located on the horizontally oriented surface 106, the first cover lens portion 116 is oriented in an outward direction generally along the horizontal plane 128. Accordingly, the first cover lens portion 116 of the horizontally oriented media device 102 is configured to receive the incident IR signal 126*a* that is transmitted from the remote control 104.

In FIG. 2, the exemplary media device 102 is illustrated as being mounted behind the visual media presentation device 110 with a portion of its vertically oriented second surface 124 extending out from behind the visual media presentation device 110. Alternatively, the media device 102 may be mounted vertically in another location.

As illustrated in FIG. 2, when the exemplary embodiment of media device 102 is vertically oriented, the second cover lens portion 118 is oriented in an outward direction generally along the horizontal plane 128. Accordingly, the second cover lens portion 118, when the media device 102 is vertically oriented, is configured to receive the incident IR signal 126*b* that is transmitted from the remote control 104.

In an exemplary embodiment, the two-way cover lens 114 embodiment is located along an edge 130 defined by the joining of the first surface 122 and the second surface 124. In this exemplary embodiment, the first surface 122 is configured to receive the first cover lens portion 116 and the second surface 124 is configured to receive the second cover lens portion 118. In the various embodiments, the two-way cover lens 114 may be located at any position along the edge 130 of the media device 102.

The exemplary two-way cover lens 114 may be of any suitable size so as to facilitate reception of the incident IR signal 126*a*/126*b* that is transmitted from the remote control 104. The exemplary two-way cover lens 114 may be made of any suitable material that has a suitable transmittance characteristic such that a sufficient amount of the incident IR signal 126*a*/126*b* passes through the two-way cover lens 114 so as to be detectable by an IR detector (not shown) located within the media device 102.

Figure 3A:
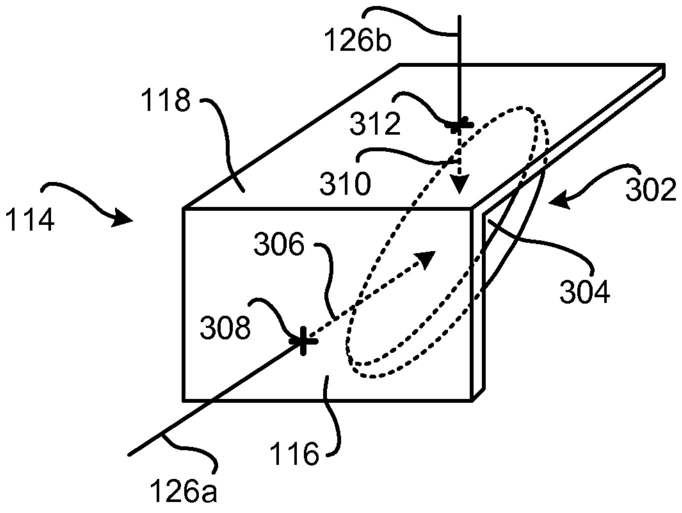
FIG. 3A is a perspective view and FIG. 3B is a side view of an embodiment of a two-way cover lens.
Figure 3B:
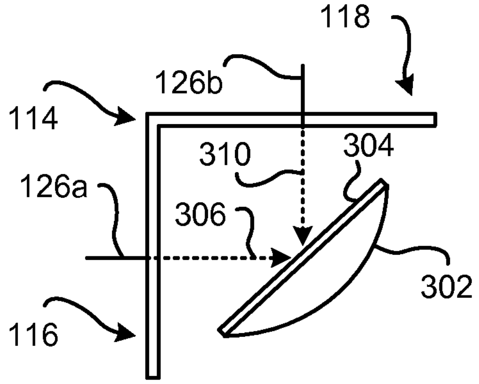

FIG. 3A is a perspective view an embodiment of the two-way cover lens 114. FIG. 3B is side view of an embodiment of the two-way cover lens 114. Also illustrated is an exemplary IR detector 302 that is located within the media device 102. The IR detector 302 is located behind the exemplary two-way cover lens 114 so as to be able to detect IR signals passing through the two-way cover lens 114.

In this exemplary configuration, the detector surface 304 of the exemplary IR detector 302 is oriented so as to be able to receive a portion 306 of the incident IR signal 126*a* that is transmitted from the remote control 104 when the media device 102 is horizontally oriented. For example, the IR signal 126*a* is incident on the first cover lens portion 116 at the location 308. Based on the transmittance characteristics of the first cover lens portion 116, the IR signal portion 306 is incident on the detector surface 304 of the IR detector 302. Information encoded into the incident IR signal portion 306 may then be determined by other components (not shown) of the horizontally oriented media device 102.

In some situations, the media device 102 may be vertically oriented such that the second cover lens portion 118 is oriented so as to receive the incident IR signal 126*b* that is transmitted from the remote control 104, such as illustrated in FIG. 2. When the media device 102 is vertically oriented, the detector surface 304 of the exemplary IR detector 302 is oriented so as to be able to receive a portion 310 of the incident IR signal 126*b* that is transmitted from the remote control 104. For example, the IR signal 126*b* is incident on the second cover lens portion 118 at the location 312. Based on the transmittance characteristics of the second cover lens portion 118, the IR signal portion 310 is incident on the detector surface 304 of the IR detector 302. Information encoded into the incident IR signal portion 310 may then be determined by other components (not shown) of the vertically oriented media device 102.

Figure 4:
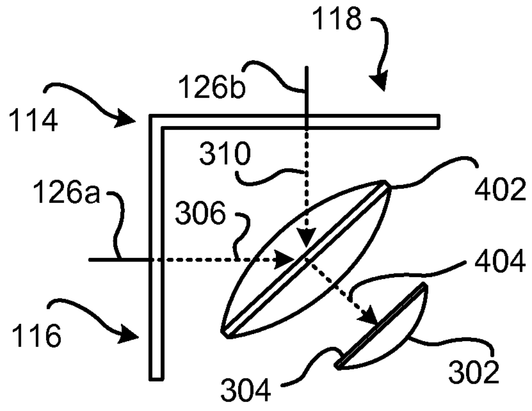
FIG. 4 is a side view of an embodiment of the two-way cover lens that employs a signal conditioning lens.

FIG. 4 is a side view of an embodiment of the two-way cover lens 114 that employs a signal conditioning lens 402. For example, the detector surface 304 of the exemplary IR detector 302 may be suited for detecting the incident IR signal portion 404 that is received along a path that is substantially perpendicular to the detector surface 304. Here, the signal conditioning lens 402 is configured to receive the IR signal portion 306, transmit and refract the received IR signal portion 306 (or at least a substantial portion thereof based on the transmittance characteristics of the signal conditioning lens 402), such that the exiting IR signal portion 404 is transmitted in a direction that is substantially perpendicular to the detector surface 304. The signal conditioning lens 402 similarly transmits and refracts the received IR signal portion 310.

The signal conditioning lens 402 may be comprised of any suitable material and may employ any suitable structure. For example, the signal conditioning lens 402 may be made of a glass or plastic material of a suitable shape so as to refract the incident IR signal towards the detector surface 304. In another embodiment, the signal conditioning lens 402 may comprise one or more wave guides or other fiber optic elements that are configured to transmit the incident IR signal towards the detector surface 304. Further, the signal conditioning lens 402 may be configured to perform other types of desirable signal conditioning to the incident IR signal, such as, but not limited to, filtering, polarizing, phase shifting, or the like.

Figure 5:
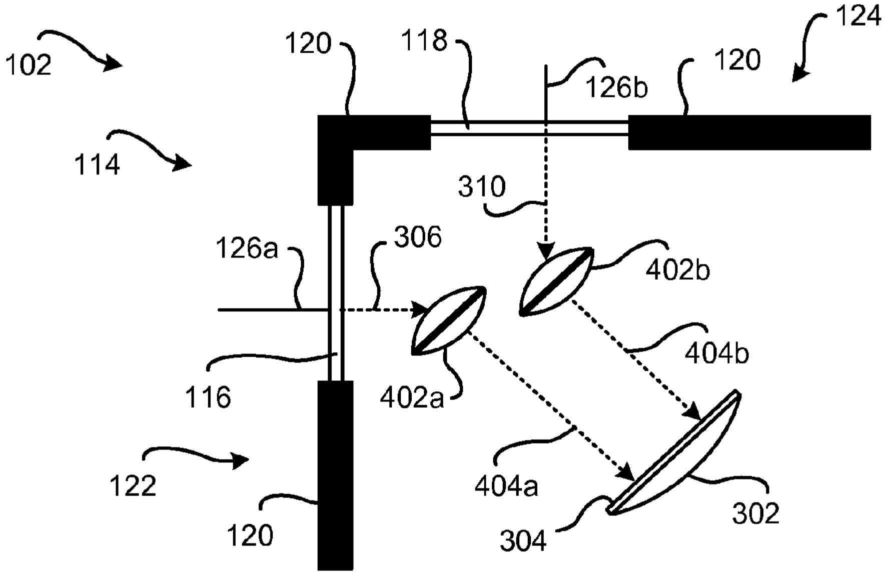
FIG. 5 is a side view of an embodiment of the two-way cover lens that employs separated signal conditioning lens.

FIG. 5 is side view of an embodiment of the two-way cover lens 114 that employs separated signal conditioning lens 402*a*, 402*b*. In this exemplary embodiment, the first signal conditioning lens 402*a* is positioned and oriented so as to facilitate transmission of the IR signal portion 306 received from the first cover lens portion 116 to the IR detector 302 when the media device 102 is horizontally oriented. The second signal conditioning lens 402*b* is positioned and oriented so as to facilitates transmission of facilitate transmission of the IR signal portion 310 received from the second cover lens portion 118 to the IR detector 302 when the media device 102 is vertically oriented. The signal conditioning lens 402*a*, 402*b* may be comprised of any suitable material and may employ any suitable structure.

In this exemplary embodiment, the first cover lens portion 116 and the second cover lens portion 118 may be separate structure that are separated from each other by portions of the enclosure 120 of the media device 102. Accordingly, apertures disposed in the enclosure 120 of the media device 102 may be located so that a single IR detector 302 may be used to detect incident IR signal 126*a*, 126*b* transmitted from the remote control 104 when the media device 102 is either horizontally oriented or vertically oriented. In an alternative embodiment, two IR detectors 302 may be used to separately detect the incident IR signals 126*a*, 126*b* transmitted from the remote control 104. Alternatively, or additionally, the signal conditioning lens 402*a*, 402*b* may be employed to direct the IR signals to the detector surface 304.

Figure 6:
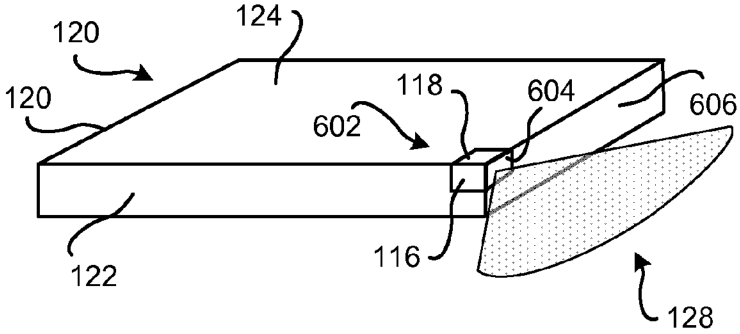
FIG. 6 is a perspective view illustrating an alternative embodiment of the IR detector system implemented in a media device that employs a three-way cover lens.

FIG. 6 is a perspective view illustrating an embodiment of the IR detector system implemented in the media device 102 that employs a three-way cover lens 602. The three-way cover lens 602 comprises the first cover lens portion 116, the second cover lens portion 118, and a third cover lens portion 604. The third cover lens portion 604 is on the third surface 606 of the media device 102. The third surface 608 is orthogonally oriented to the first surface 122 and the second surface 124. Accordingly, the media device 102 may be horizontally oriented in a direction that is substantially perpendicular to the orientation of the media device 102 illustrated in FIG. 1.

For example, the second surface 124 of the media device 102 may have a rectangular shape, wherein the vertically oriented surface 606 of the enclosure 120 is the narrower side of the media device 102. To conserve shelf space or the like, the user of the media device 102 may horizontally orient the media device 102 so that the third cover lens portion 604 is oriented in an outward direction along the horizontal plane 128 that generally extends outward into a space where the user is likely to be located while viewing the presented media content.

In this exemplary embodiment, the first cover lens portion 116, the second cover lens portion 118, and the third cover lens portion 604 are fabricated as a unitary body cover lens located at a corner of the media device 102. In other embodiments, one or more of the first cover lens portion 116, the second cover lens portion 118, and the third cover lens portion 604 are separate portions.

Figure 7:
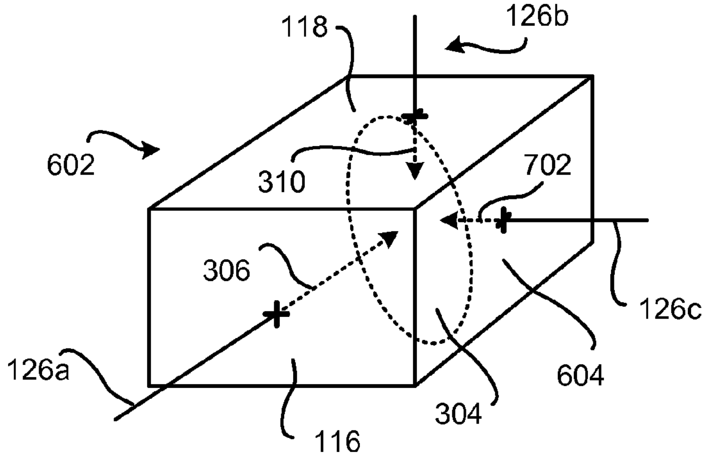
FIG. 7 is perspective view of the three-way cover lens.

FIG. 7 is a perspective view of the three-way cover lens 602. The IR signal 126*c* that is transmitted from the remote control 104 is incident on the third cover lens portion 604. The detector surface 304 is oriented so as to be able to receive the IR signal portion 702. Further, in this exemplary embodiment, the detector surface 304 is oriented so as to be able to receive the IR signal portion 306 through the first cover lens portion 116 and the IR signal portion 310 received through the second cover lens portion 118.

In an alternative embodiment, three IR detectors 302 may be used. Alternatively, or additionally, a plurality of signal conditioning lens 402 may be employed to direct the IR signals to the detector surface(s) 304.

It should be emphasized that the above-described embodiments of the IR detector system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device infrared (IR) signal detection system, comprising:

a media device configured to receive media content;

at least one IR detector residing in the media device, the at least one IR detector configured to receive a portion of an IR signal emitted from a remote control; and a cover lens disposed in an enclosure of the media device, the cover lens comprising:

a first cover lens portion configured to receive the IR signal emitted from the remote control when the media device is in a horizontally oriented position, and configured to transmit the portion of the received IR signal to the at least one IR detector; and a second cover lens portion configured to receive the IR signal emitted from the remote control when the media device is in a vertically oriented position, and configured to transmit the portion of the received IR signal to the at least one IR detector, wherein the enclosure of the media device further comprises:

a first surface that is configured to receive the first cover lens portion, wherein the first cover lens portion is oriented in a first outward direction to receive the IR signal emitted from the remote control when the media device is in the horizontally oriented position; and a second surface oriented substantially perpendicular to the first surface and joined with the first surface at an edge, wherein the second surface is configured to receive the second cover lens portion, and wherein the second cover lens portion is oriented in a second outward direction to receive the IR signal emitted from the remote control when the media device is in the horizontally oriented position, and wherein the first outward direction and the second outward direction are substantially perpendicular to each other.

2. The media device IR signal detection system of claim 1, wherein the horizontally oriented position of the media device is a first horizontally oriented position, wherein the cover lens further comprises:

a third cover lens portion configured to receive the IR signal emitted from the remote control, and configured to transmit a third portion of the received IR signal to the at least one IR detector when the media device is oriented in a second horizontally oriented position, wherein the enclosure of the media device further comprises:

a third surface that is configured to receive the third cover lens portion, wherein the third cover lens portion is oriented in a third outward direction to receive the IR signal emitted from the remote control when the media device is in the second horizontally oriented position.

3. The media device IR signal detection system of claim 2, wherein the first cover lens portion, the second cover lens portion, and the third cover lens portion are fabricated as a unitary body cover lens, wherein the first cover lens portion, the second cover lens portion, and the third cover lens portion are located at a corner of the enclosure where the first surface, the second surface and the third surface are joined together.

4. The media device IR signal detection system of claim 1, wherein the first cover lens portion and the second cover lens portion are joined and are located at the edge of the enclosure, and wherein the first cover lens portion and the second cover lens portion are oriented substantially perpendicular to each other.

5. The media device IR signal detection system of claim 1, wherein the first cover lens portion and the second cover lens portion are separate, and wherein the first cover lens portion and the second cover lens portion are oriented substantially perpendicular to each other.

6. The media device IR signal detection system of claim 1, wherein the at least one IR detector is a first IR detector configured to detect the portion of the IR signal through the first cover lens portion when the media device is in the horizontally oriented position, and wherein the media device further comprises:

a second IR detector configured to detect the portion of the IR signal through the second cover lens portion when the media device is in the vertically oriented position.

7. The media device IR signal detection system of claim 1, wherein the media device further comprises:

at least one signal conditioning lens configured to refract the first portion of the received IR signal to the IR detector, and configured to refract the second portion of the received IR signal to the IR detector.

8. The media device IR signal detection system of claim 1, wherein the first cover lens portion is not oriented to receive the IR signal emitted from the remote control when the media device is in the vertically oriented position, and wherein the second cover lens portion is not oriented to receive the IR signal emitted from the remote control when the media device is in the horizontally oriented position.

9. A method for detecting remote control emitted infrared (IR) signals at a media device, the media device comprising an enclosure defined by at least a first surface and a second surface, wherein the first surface is substantially perpendicular to the second surface, and wherein the first surface is joined with the second surface at an edge, the method comprising:

receiving an IR signal at a first cover lens portion disposed on the first surface of the media device when the media device is in a horizontally oriented position, wherein the first cover lens portion is oriented in a first outward direction; and receiving the IR signal at a second cover lens portion disposed on the second surface of the media device when the media device is in a vertically oriented position, wherein the second cover lens portion is oriented in a second outward direction, wherein the first outward direction and the second outward direction are substantially perpendicular to each other.

10. The method of claim 9, wherein the media device comprises an IR detector located behind the first cover lens portion and the second cover lens portion, and further comprising:

detecting a portion of the IR signal through the first cover lens portion at the IR detector when the media device is in the horizontally oriented position; and detecting the portion of the IR signal through the second cover lens portion at the IR detector when the media device is in the vertically oriented position.

11. The method of claim 9, wherein the horizontally oriented position of the media device is a first horizontally oriented position, and further comprising;

receiving the IR signal at a third cover lens portion disposed on a third surface of the media device when the media device is in a second horizontally oriented position, wherein the third surface is orthogonally oriented to the first surface and the second surface.

12. The method of claim 11, wherein the first cover lens portion, the second cover lens portion, and the third cover lens portion are fabricated as a unitary body cover lens.

13. The method of claim 11, wherein the first cover lens portion, the second cover lens portion, and the third cover lens portion are located at a corner of the enclosure where the first surface, the second surface and the third surface are joined together.

14. The method of claim 9, wherein the first cover lens portion is not oriented to receive the IR signal emitted from the remote control when the media device is in the vertically oriented position, and wherein the second cover lens portion is not oriented to receive the IR signal emitted from the remote control when the media device is in the horizontally oriented position.

15. A media system, comprising:

a media device configured to receive media content, and configured to operate in one of a horizontally oriented position and a vertically oriented position;

a remote control configured to transmit an infrared (IR) signal to the media device, wherein the IR signal comprises information to control at least one of the media device and a presentation device communicatively coupled to the media device;

at least one IR detector residing in the media device, and configured to receive a portion of the IR signal emitted from the remote control; and a cover lens defined by a first cover lens portion and a second cover lens portion disposed in an enclosure of the media device, the cover lens configured to receive the IR signal emitted from the remote control, and configured to transmit the portion of the IR signal to the IR detector when the media device is in one of the horizontally oriented position and the vertically oriented position, wherein the enclosure of the media device further comprises:

a first surface that is configured to receive the first cover lens portion, wherein the first cover lens portion is oriented in a first outward direction to receive the IR signal emitted from the remote control when the media device is in the horizontally oriented position; and a second surface oriented substantially perpendicular to the first surface and joined with the first surface at an edge and is configured to receive the second cover lens portion, wherein the second cover lens portion is oriented in a second outward direction to receive the IR signal emitted from the remote control when the media device is in the horizontally oriented position, wherein the first outward direction and the second outward direction are substantially perpendicular to each other.

16. The media system of claim 15, wherein the horizontally oriented position is a first horizontally oriented position, wherein the edge joining the first surface and the second surface is a first edge, wherein the enclosure of the media device further comprises a third surface oriented substantially perpendicular to the first surface and the second surface, wherein the third surface is joined with the first surface at a second edge, wherein the third surface is joined with the second surface at a third edge, and wherein the cover lens further comprises:

a third cover lens portion in the third surface that is configured to receive the IR signal emitted from the remote control when the media device is oriented in a second horizontally oriented position, and is configured to transmit a third portion of the received IR signal to the IR detector.

17. The media system of claim 16, wherein the first cover lens portion, the second cover lens portion, and the third cover lens portion are fabricated as a unitary body cover lens.

18. The media system of claim 16, wherein the first cover lens portion, the second cover lens portion, and the third cover lens portion are located at a corner of the enclosure where the first surface, the second surface and the third surface are joined together.

19. The media system of claim 15, wherein the first cover lens portion and the second cover lens portion are joined, and wherein the first cover lens portion and the second cover lens portion are oriented substantially perpendicular to each other.

20. The media system of claim 15, wherein the first cover lens portion is not oriented to receive the IR signal emitted from the remote control when the media device is in the vertically oriented position, and wherein the second cover lens portion is not oriented to receive the IR signal emitted from the remote control when the media device is in the horizontally oriented position.

* * * * *